(12) United States Patent
Niewiera

(10) Patent No.: US 8,360,227 B2
(45) Date of Patent: Jan. 29, 2013

(54) APPARATUS AND METHOD FOR ORIENTING SHOCK-SENSITIVE GLASS PLATES IN ULTRA CLEAN ROOMS

(75) Inventor: Wolfgang Niewiera, Donauwoerth (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 90 days.

(21) Appl. No.: 12/740,107

(22) PCT Filed: Oct. 24, 2008

(86) PCT No.: PCT/DE2008/001736
§ 371 (c)(1),
(2), (4) Date: Apr. 27, 2010

(87) PCT Pub. No.: WO2009/056101
PCT Pub. Date: May 7, 2009

(65) Prior Publication Data
US 2010/0230237 A1 Sep. 16, 2010

(30) Foreign Application Priority Data
Oct. 31, 2007 (DE) .......................... 10 2007 052 183

(51) Int. Cl.
B65G 47/10 (2006.01)

(52) U.S. Cl. ................... 198/373; 198/416; 198/370.09; 198/347.1

(58) Field of Classification Search .................. None
See application file for complete search history.

(56) References Cited

U.S. PATENT DOCUMENTS

| 5,293,984 A | | 3/1994 | Lucas | |
| 5,413,204 A | * | 5/1995 | Mori et al. | 198/345.1 |
| 7,234,584 B2 | * | 6/2007 | Rice et al. | 198/465.1 |

(Continued)

FOREIGN PATENT DOCUMENTS

| DE | 3311116 | 9/1984 |
| DE | 69207737 | 5/1996 |

(Continued)

OTHER PUBLICATIONS

Japanese Patent Office; "Notice of Reasons for Rejection" mailed Feb. 21, 2012, pp. 1-5.

Primary Examiner — Kavel Singh
(74) Attorney, Agent, or Firm — Duane Morris LLP; J. Rodman Steele, Jr.; Gregory M. Lefkowitz

(57) ABSTRACT

Disclosed are a method and an apparatus for orienting thin glass plates (11) in a contamination-free manner. Said method and apparatus have the following features: a) in order to orient the glass plate (11), a lifting frame (1) is raised from below through the free space between the rolls (13) along with an orienting frame (2) which rests on the lifting frame (1) and is fitted with struts (7) that are connected in a rotatably hinged fashion to the orienting frame (2) and are provided with supporting elements (8) which penetrate the free space between the rolls (13), project beyond the supporting level of the rolls (13), and support the glass plate (11); b) the glass plate (11) is placed in a shock-free manner by means of sliding elements (3) that are actuated by individually controllable drive units (4), the movement of the sliding elements (3) being transmitted to the two longitudinal cross beams of the orienting frame (2) by means of pivot joints (6) which are fastened to the sliding elements (3).

10 Claims, 2 Drawing Sheets

U.S. PATENT DOCUMENTS

| | | | |
|---|---|---|---|
| 7,428,959 B2 * | 9/2008 | Jung et al. | 198/493 |
| 2007/0098539 A1 | 5/2007 | Chang et al. | |

FOREIGN PATENT DOCUMENTS

| | | |
|---|---|---|
| DE | 102005062936 | 7/2007 |
| EP | 1541296 | 6/2005 |
| EP | 1591427 | 11/2005 |
| EP | 1647532 | 4/2006 |
| FR | 2793780 | 11/2000 |
| JP | 06348025 A | 12/1994 |
| JP | 2000031238 A | 1/2000 |
| JP | 2003182811 A | 7/2003 |
| JP | 2003226425 A | 8/2003 |
| JP | 2004253808 A | 9/2004 |
| JP | 2006269498 A | 10/2006 |
| WO | 2007032530 A1 | 3/2007 |

* cited by examiner

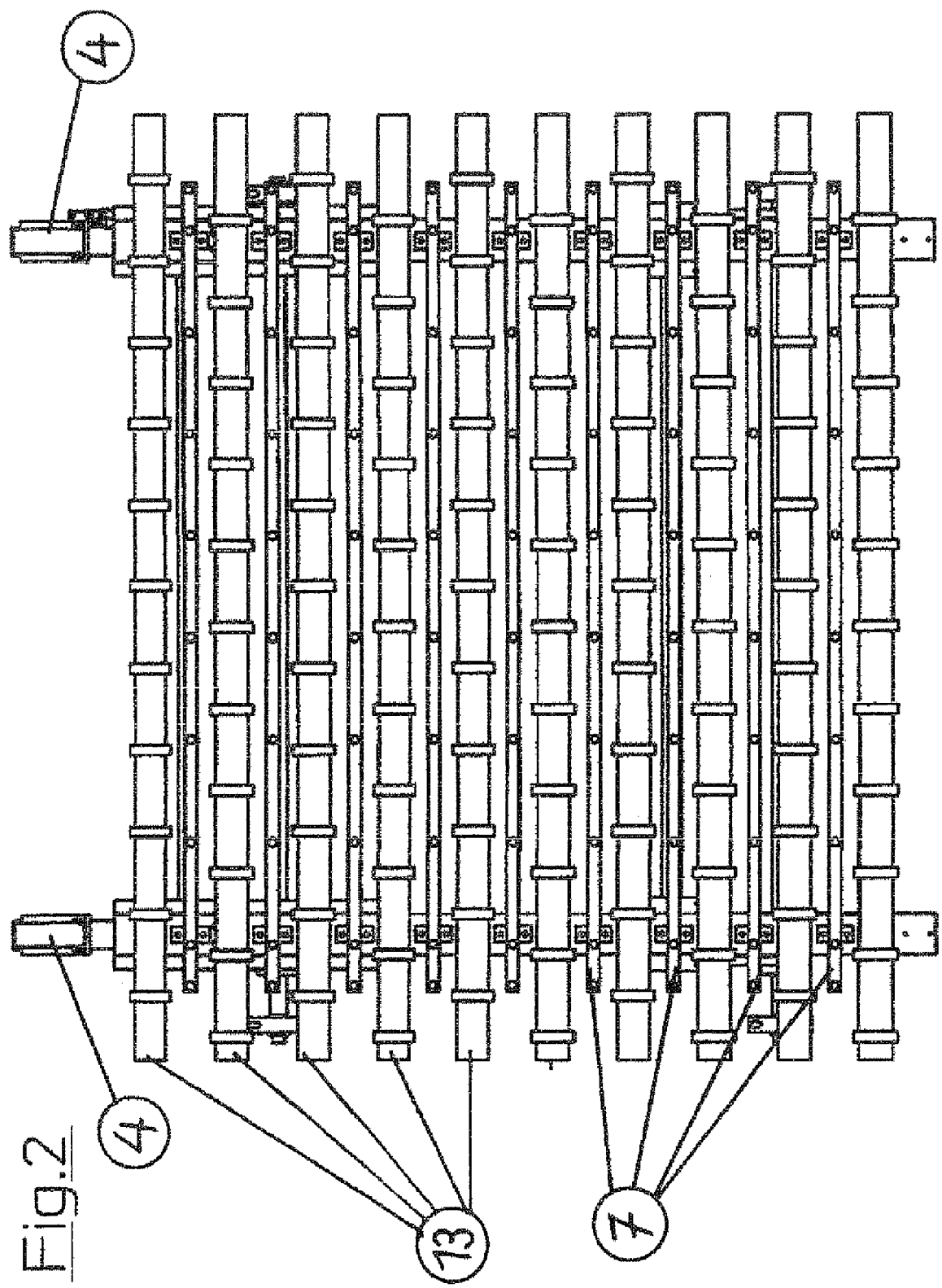

APPARATUS AND METHOD FOR ORIENTING SHOCK-SENSITIVE GLASS PLATES IN ULTRA CLEAN ROOMS

CROSS-REFERENCE TO RELATED APPLICATIONS

This application is a §371 national stage entry of International Application No. PCT/DE2008/001736, filed Oct. 24, 2008, which claims priority to German Patent Application No. 10 2007 052 183.0, filed Oct. 31, 2007, both of which are hereby incorporated by reference.

BACKGROUND

The production and further processing of crystalline plates is increasingly required in the production of large flat screens, and in a large quantity.

Modern flat screens are increasingly replacing the old tube monitors, and are also becoming less and less expensive. These are based on TFT/LCD technology. In this context, LCD (Liquid Crystal Display) represents the use of liquid crystals in the individual pixels of the screen, and TFT stands for Thin Film Transistor. The TFTs are very small transistor elements which control the orientation, and therefore the light transmission, of the liquid crystals.

A flat-screen display consists of numerous pixels. In turn, each pixel consists of 3 LCD cells (subpixels), corresponding to the colors of red, green and blue. A 15-inch screen (measured diagonally) contains about 800,000 pixels or roughly 2.4 million LCD cells.

For understanding of the mode of operation:

A liquid crystal cell (LCD cell) works in a similar manner to polaroid sunglasses. If two polaroid glasses are held one above the other and then twisted with respect to each other, it is initially possible to see less and less and then nothing at all. This effect arises because polaroid glass is transparent only to light waves which vibrate in a specific plane. If two such glasses are held one above the other and twisted through 90° with respect to each other, some of the light can still pass through the first glass, but no longer through the second glass, since this is then transverse to the incoming light waves and filters them out.

An LCD cell works on the same principle. It consists of two polaroid glasses which are twisted through 90° with respect to each other and through which no light can therefore pass, in accordance with that explained above. A layer of liquid crystals, which has the natural property of turning the vibration plane of light, is located between these two polaroid glasses. This layer of liquid crystals is just thick enough that the light passing through the first polaroid glass is turned back through 90°, and can therefore also pass through the second polaroid glass, i.e. is visible to the viewer.

If the liquid crystal molecules are then turned away from their natural position by the application of an electrical voltage, less light passes through the cell and the corresponding pixel becomes dark. The corresponding voltage is produced by a TFT element which is part of every LCD cell. The light for the LCD display is produced in the rear part of the screen housing by small fluorescent tubes, as are used on a larger scale for illuminating rooms.

Since each pixel has three color filters for the colors of red, green and blue, the control of the transparency of these filters means that each pixel can assume a desired color mixture or a desired color.

For standard office applications, flat screens have outstanding sharpness and a sufficient color quality. In ergonomic terms, TFTs also have much to offer: smaller space requirement, a power consumption which is only a third of that of a tube monitor and significantly lower emission of radiation.

As is conventional in microelectronics, the production of TFT screens requires so-called ultra-clean rooms. This is necessary because, in view of the small size of the line-carrying structures, even small particles can cause line interruptions during the production process. In the production of a TFT screen, such a line interruption would result in the failure of a pixel.

A clean room is a room in which the concentration of airborne particles is controlled. It is constructed and used in such a manner that the number of particles introduced into the room or produced and deposited in the room is as small as possible, and other parameters, such as temperature, humidity or air pressure, are controlled as required.

On the one hand, TFT screens are currently becoming less and less expensive, and on the other hand the demand for screens with enormous proportions is increasingly standing out, all the more so because screens of this type firstly can be used very easily at major events and secondly are available in affordable price ranges due to modern production technology.

However, the production of large screens requires the use of special machines even in ultra-clean rooms to handle the large-surface-area, thin glass plates required in this case.

For this purpose, it is possible to use primarily multi-axle industrial robots.

The use of a wide variety of embodiments of multi-axle industrial robots in technology for producing a wide variety of products can be gathered from the prior art. Industrial robots of this type are used in large halls mostly for transporting unmanageable and heavy loads, but can also be used beneficially in the production of smaller machine parts. What matters in all cases is the reproducible precision of the movement sequences of the individual grasping operations, transport movements and setting-down operations.

Here, the conditions in which these movement sequences take place are mostly unimportant. For example, it is mostly immaterial which noise emission such a movement sequence causes, or whether such an operation is associated with the movement of dust or a more or less large escape of lubricant. Unavoidable abrasion of moving machine parts which cause friction is also mostly unremarkable.

By contrast, natural ramifications of this type must be taken into consideration when working in an environment at risk from contamination, for example in the food-processing industry or in the pharmaceutical industry.

Thus, EP 1 541 296 A1 discloses a manipulator, such as an industrial robot, for use in an environment at risk from contamination, having a number of scavenging chambers, which can be charged with a scavenging medium, in the region of drive units of the manipulator. The object to be achieved in the case of such a device is to further develop the device to such an extent that the manipulator can safely be used in an environment at risk from contamination in a structurally simple manner and therefore, in particular, at low cost.

This object is achieved by a dedicated scavenging chamber being associated with each of a plurality of groups of drive units (claim 1).

Although the environment in which such an industrial robot is to be used is more sensitive to contamination and therefore also places higher demands on the design configuration compared to a normal environment, special demands of this type cannot be compared with the conditions demanded in ultra-clean rooms.

Apart from what has been mentioned above, large, thin glass plates such as those used for producing large TFT screens are extremely sensitive to very small shocks owing to their crystalline structure and concurrent relatively large mass. Therefore, an industrial robot is also unsuitable for handling large, thin glass plates in ultra-clean rooms because it lacks sensitivity and positional accuracy.

DE 10 2005 062 936 A1 discloses an apparatus and a process for the positional correction of disk-shaped elements transported by means of a conveying element.

This positional correction should take place automatically. In order to achieve this object, the intention is substantially to protect the fact that it is possible to determine detection instants at which an outer contour of the disk-shaped element passes in each case into a detection region of a sensor. The handling of large, thin glass plates in ultra-clean rooms is not possible using this apparatus.

DE 692 07 737 T2 discloses an apparatus for handling and orienting bundled, flat articles, in particular consisting of cardboard or corrugated paper plates or blanks. The object on which this apparatus is based is that it should be designed at lower cost and in a more spatially compact manner compared with the prior art. This object is substantially achieved in that two conveying elements which are displaceable vertically in relation to each other can be displaced laterally, and that the other conveying element comprises a series of driven rollers which are separate from each other and between which there are driven balls. This apparatus is intended to handle bundled, flat articles of cardboard or corrugated board. The handling of glass plates is not possible with this apparatus.

DE 33 11 116 A1 relates to a process and an apparatus for orienting plates on a roller table by means of forces acting on the plates. The process in question is characterized in that forces of different direction and magnitude are transmitted, via roller contact, to a plurality of regions of a moving plate. A suggestion to handle large, thin glass plates in ultra-clean rooms cannot be gathered from this process or this apparatus.

SUMMARY OF THE INVENTION

Therefore, the apparatus according to the invention and, respectively, the process according to the invention are based on the object of ensuring extremely accurate positioning in the transport of large, thin glass plates in ultra-clean room conditions.

This object is achieved by an apparatus as claimed in claim 1 and by a process as claimed in claim 6.

Advantageous embodiments are defined in the dependent claims.

BRIEF DESCRIPTION OF THE DRAWINGS

The apparatus according to the invention is described in more detail below.

In detail:

FIG. 2: shows a transport apparatus leading to the positioning apparatus

DETAILED DESCRIPTION

Figure 1:
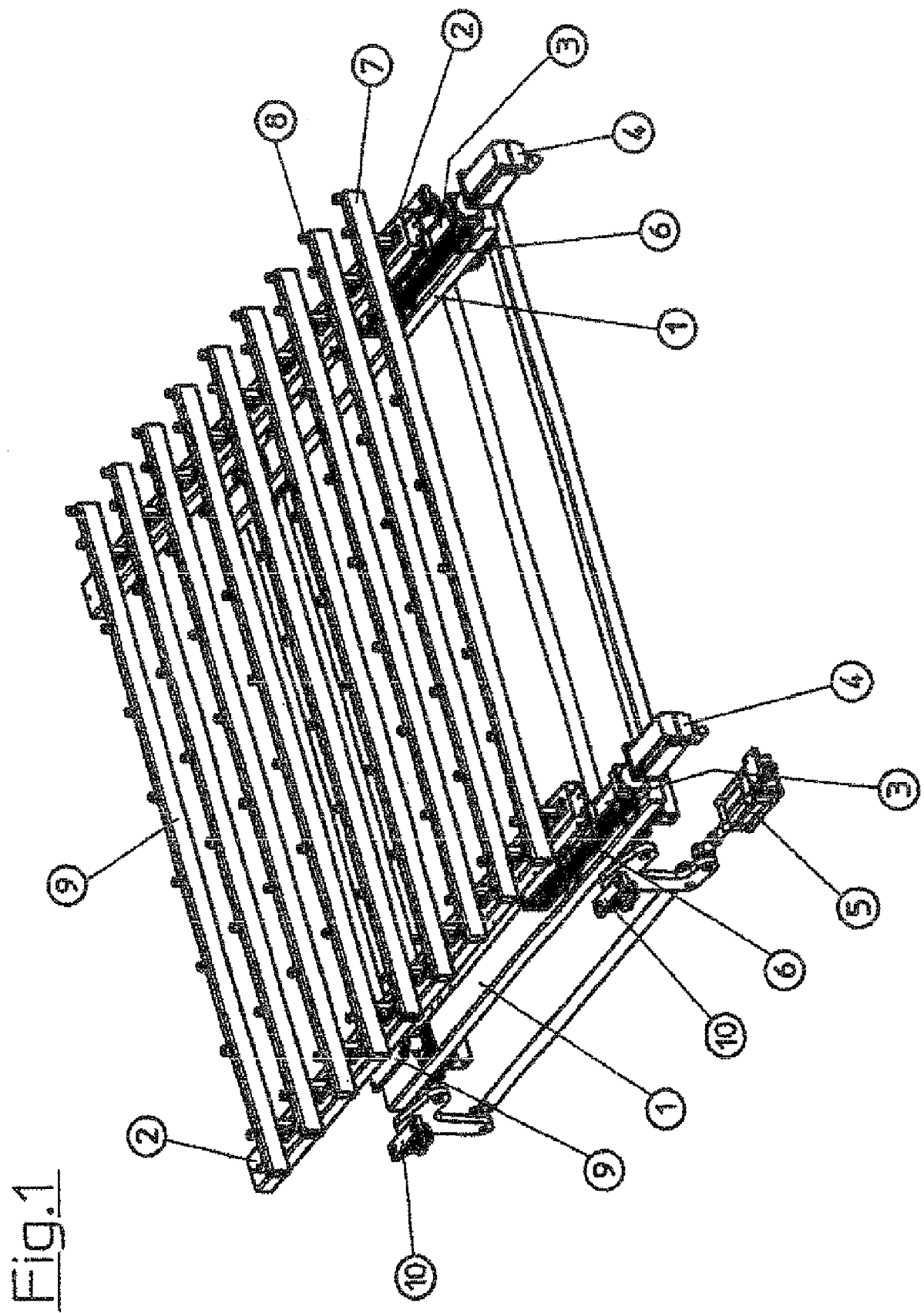
FIG. 1: shows a positioning apparatus according to the invention.

For ultra-clean rooms, as are used in microelectronics, there are a plurality of hierarchical areas with a corresponding clean room class. Thus, the ultra-clean room (class 10 and better), in which substrates are being processed, is surrounded by a separate area with the systems required for coating and structuring. Pumps required for vacuum technology are usually located on an underlying story.

Access is usually gained to the ultra-clean rooms through a sequence of different clean room areas with a decreasing clean room class. A change of clothes is generally required between these areas. In order to minimize soiling by items which come into contact with the floor (e.g. soles of a shoe), special sticky foot mats are located at each of the access points. Access to the ultra-clean room itself is gained additionally through air locks for people and materials in which, in turn, strong air flows and filter systems whirl up and extract particles which are present, such that no additional contamination is brought in from outside.

Materials which are used in clean rooms have to have abrasion-resistant surfaces. Systems and devices which have been erected may only cause minimum disruption to the laminar air flow. A clean room is generally subjected to overpressure (overpressure ventilation).

The glass plates 11 used in the ultra-clean room are cleaned in one of the preceding rooms and packed in a plurality of protective covers.

These protective covers are then removed again, depending on the respective processing operation of the glass plates 11 and depending on the clean room conditions or ultra-clean room conditions required.

The glass plates 11 access the room in which the orientation and positioning according to the invention take place through an air lock, through which a roller conveyor passes. A roller conveyor of this type comprises a sequence of rollers 13. The rollers 13 can each transport a glass plate 11 to its next intended location via a dedicated drive with a dedicated control system and bearings which are designed in accordance with the clean room conditions required, or indirectly via a drive operating in groups.

If the respective glass plate 11 then reaches the region of the orienting unit, its position is detected by sensors 12 and the glass plate 11 is brought to a stop in a preliminary position.

A wide variety of types and arrangements of sensors of a wide variety of constructions which are familiar to a person skilled in the art can be used as sensors 12, depending on the respective requirements.

For the actual orientation of a glass plate 11, a lifting frame 1 bearing an orienting frame 2 is raised underneath the rollers, the orienting frame in turn bearing cross braces 7 with support elements 8 which pass through the free space between the rollers and protrude beyond the support level of the rollers.

The lifting frame 1 is raised using the drive 5 which brings about the deflection of lifting elements via a lever linkage and the shortening of a threaded rod. However, it is also possible to employ other options which are known to a person skilled in the art, have a lifting action and are compatible with the conditions in the ultra-clean room.

The orienting frame 2 bears support elements 8 which are fastened on rotatably mounted cross braces 7, have an anti-marking surface, make contact with the glass plate 11 on the underside and thereby bear the latter.

The orienting frame 2 is firstly displaceably mounted on displacement supports 9 via displacement elements 3 which can be driven individually by drives 4, as a result of which the two longitudinally extending crossbeams of the orienting frame 2, which are connected in an articulated manner to the rotatably mounted cross braces 7, can be arranged in different positions.

This ensures that the orienting frame 2 can not only be displaced in parallel as a whole and thus finely adjusted, but can also be shifted into an inclined position like a parallelogram, and the orienting frame 2 moves the glass plate 11 resting on the support elements 8 into the desired position.

The precise positioning of the glass plate 11 can be monitored using line lasers or markings, the position of which is monitored using lasers and/or sensors.

A glass plate 11 can therefore be positioned with the greatest possible precision and fed for further processing in ultra-clean room conditions.

This is achieved in that, after the operation for the precise orientation of the glass plate 11, monitored by sensors, the lifting frame 1 is lowered to such an extent that the glass plate 11 rests on the rollers again.

The interactive control of the movement elements and sensors 12 used in each case requires a special control program.

LIST OF REFERENCE NUMERALS (1) Lifting frame for orienting unit
(2) Orienting frame
(3) Displacement elements
(4) Drive of the displacement elements
(5) Drive of the lifting frame
(6) Rotary joints of the orienting frame
(7) Cross braces, accommodation of push-away elements
(8) Push-away elements, support elements
(9) Displacement support for the orienting frame
(10) Pivot bearing for the lifting unit
(11) Glass plate
(12) Sensors
(13) Rollers

The invention claimed is:

1. An apparatus for the contamination-free orientation of thin, shock-sensitive crystalline plates, in particular glass plates (11), said apparatus comprising:
 a) rollers (13) each having a dedicated drive for conveying a glass plate (11) on an orienting unit,
 b) an apparatus for orienting the glass plate (11), wherein a lifting frame (1) with an orienting frame (2) lying thereon is raised from below through the free space between the rollers (13), and the orienting frame (2) has longitudinally extending cross braces (7) which are connected thereto in an articulated manner such that they can rotate, have support elements (8) and pass through the free space between the rollers (13), protrude beyond the support level of the rollers (13) and support the glass plate (11),
 c) an apparatus for the shock-free positioning of a glass plate (11) via laterally moving slide elements (3) operated by individually actuable drives (4), the lateral movement of the slide elements (3) being transmitted to the longitudinally extending cross braces (7) of the orienting frame (2) via rotary joints (6) fastened on the slide elements (3).

2. The apparatus as claimed in claim 1,
 wherein the support elements (8) are produced from an anti-marking and abrasion-resistant material.

3. The apparatus as claimed in claim 1,
 wherein the pivot bearings (10), the rotary joints (6) and the joints of the sliding support (9) are encapsulated in an emission-free manner and are produced from abrasion-resistant material.

4. The apparatus as claimed in claim 1,
 wherein the positioning of the glass plate (11) is monitored using lasers and/or sensors.

5. A process for the contamination-free orientation of thin, shock-sensitive crystalline plates, in particular glass plates (11), in ultra-clean room conditions, said process comprising:
 a) transporting a glass plate (11) via rollers (13) each with a dedicated drive through an air lock from a clean room into the ultra-clean room,
 b) conveying, in the ultra-clean room, the glass plate (11) via rollers (13) each with a dedicated drive to an orienting unit,
 c) orienting the glass plate (11) by raising a lifting frame (1) with an orienting frame (2) lying thereon from below through the free space between the rollers (13), wherein the orienting frame (2) has longitudinally extending cross braces (7) which are connected thereto in an articulated manner such that they can rotate, have support elements (8) and pass through the free space between the rollers (13), protrude beyond the support level of the rollers (13) and support the glass plate (11),
 d) positioning the glass plate (11) in a shock-free manner via laterally moving slide elements (3) operated by individually actuable drives (4), the lateral movement of the slide elements (3) being transmitted to the longitudinally extending cross braces (7) of the orienting frame (2) via rotary joints (6) fastened on the slide elements (3), and
 e) lowering, after the positioning operation, the lifting frame (1) to such an extent that the glass plate (11) rests on the rollers (13) again.

6. The process as claimed in claim 5,
 wherein the positioning of the glass plate (11) is monitored using lasers and/or sensors.

7. A computer program,
 comprising a program code for carrying out the process steps as claimed in claim 5, if the program is executed on a computer, wherein the program code is embodied in a computer program.

8. A machine-readable storage medium, comprising a program code of a computer program for carrying out the process as claimed in claim 5, if the program is executed on a computer, wherein the program code is embodied in a machine readable storage medium.

9. The apparatus as claimed in claim 1, wherein the lifting frame (1) is raised
 using a drive (5) which brings about the deflection of lifting elements via a lever linkage and the shortening of a threaded rod.

10. The method as claimed in claim 5, wherein, as part of step c), the lifting frame (1) is raised using a drive (5) which brings about the deflection of lifting elements via a lever linkage and the shortening of a threaded rod.

* * * * *